United States Patent [19]

Kelleher et al.

[11] Patent Number: 5,729,911
[45] Date of Patent: Mar. 24, 1998

[54] DEWATERING AND DRYING OF EP(D)M

[75] Inventors: Kevin M. Kelleher, Orange; Robert E. Keffer, Nederland; James R. Frazier, Orange; Chris B. Gyasi, Orange; Donald M. Zierold, Orange, all of Tex.

[73] Assignee: Bayer Corporation, Pittsburgh, Pa.

[21] Appl. No.: 773,039

[22] Filed: Dec. 23, 1996

[51] Int. Cl.$^6$ ................................ F26B 5/04
[52] U.S. Cl. ................................ 34/400
[58] Field of Search ............... 34/334, 353, 380, 34/381, 388, 397, 398, 400, 135, 139, 147; 100/121, 158 C; 366/79, 85, 147; 264/40.1, 349

[56] References Cited

U.S. PATENT DOCUMENTS

| | | | |
|---|---|---|---|
| 3,067,462 | 12/1962 | Kullgreen | 34/398 X |
| 3,230,865 | 1/1966 | Hibbel et al. | 34/398 X |
| 4,185,057 | 1/1980 | Rossiter et al. | 264/40.1 |
| 4,508,592 | 4/1985 | Kowalski | 159/2.1 |

FOREIGN PATENT DOCUMENTS

| | | |
|---|---|---|
| 4402394 | 8/1995 | Germany . |
| 404311703 | 11/1994 | Japan . |
| 884089 | 12/1961 | United Kingdom ........ 34/400 X |

OTHER PUBLICATIONS

T. Sakai et al in Epxerimental Study on Dewatering and Devolatilizing Operations Using Intermeshed Twin Screw Extruders, Intern. Polymer Processing VIII (1993) 3, (month unavailable) p. 218.

*Primary Examiner*—Henry Bennett
*Assistant Examiner*—Steve Gravini
*Attorney, Agent, or Firm*—Joseph C. Gil; Aron Preis

[57] ABSTRACT

A process for continuous dewatering/drying of EP(D)M rubber is disclosed. The process comprises continuously charging wet EP(D)M crumb into a single screw extruder having particular structural features and conveying the wet crumb through the length of the extruder under conditions sufficient to expel water, increase the pressure across the die plate of the extruder and heat the crumb. The dried crumb thus extruded is characterized in that it contains less than 1% water. The single screw extruder suitable for the process comprises an inlet or feeding end, an expeller section which contains cage bars, an expander section having a solid shell cover positioned immediately downstream from the expeller section, a die plate and a screw having a constant pitch and a, preferably gradually, decreasing channel depth.

5 Claims, 1 Drawing Sheet

DEWATERING AND DRYING OF EP(D)M

FIELD OF THE INVENTION

The invention relates to a process for dewatering and drying EP(D)M rubber, more particularly, for continuously dewatering and drying of such rubber by using a single screw extruder which includes at least one expelling section and at least one expanding section.

SUMMARY OF THE INVENTION

A process for continuous dewatering/drying of EP(D)M rubber is disclosed. The process comprises continuously charging wet EP(D)M crumb into a single screw extruder having particular structural features and conveying the wet crumb through the length of the extruder under conditions sufficient to expel water, increase the pressure across the die plate of the extruder and heat the crumb. The dried crumb thus extruded is characterized in that it contains less than 1% water. The single screw extruder suitable for the process comprises an inlet or feeding end, an expeller section which contains cage bars, an expander section having a solid shell cover positioned immediately downstream from the expeller section, a die plate and a screw having a constant pitch and a, preferably gradually, decreasing channel depth.

BACKGROUND OF THE INVENTION

Current practice of drying and dewatering of EP(D)M (the term "EP(D)M" shall refer throughout the present text to the well known copolymer or terpolymer elastomer made from ethylene-propylene (diene) monomer) entails first, the pumping of a rubber/water slurry from a slurry-tank to a rotary screen where most of the free water is removed. The screened, wet rubber (sometimes referred to as "crumb") is then introduced into an expeller which contains a conveying and compression screw. Compressed under relatively low pressure, the material is relieved of most of the remaining water which escapes through a series of cage bars. The exiting, now substantially moist, crumb is then introduced into an expander which is essentially an extruder equipped with a pumping screw and a die plate at its discharge-end. The screw of the expander has a characteristically constant pitch and constant channel depth. By the mechanical working of the rubber through the expander and by the subsequent extrusion through the die plate under moderate pressure, further dewatering of the compacted rubber is attained. The material, in a comparatively dry state, exits the die plate (outlet) in a substantially constant stream which is then cut off, generally by a rotating cutter to form EP(D)M chips.

The table below describes the process conditions applicable according to current practice to typical EP(D)M rubber.

TABLE 1

| | Inlet moisture (%) | Outlet moisture (%) | material temperature, °F. @ outlet | Operating Pressure |
|---|---|---|---|---|
| Dewatering Screen | 90 | 40 | 212 | atmospheric |
| Expeller | 40 | 6 | 250 | 30 psi |
| Expander | 6 | <0.5 | 400 | 800 psi |

Accordingly, while the multi-stage conventional process yields substantially dried crumb, there are distinct disadvantages to this practice. Occasional discoloration of the product is an undesirable characteristic of the conventional process. The mechanical working of the EP(D)M results in significant and substantial rise of the temperature of the material, reaching a level in excess of 400° F. at the outlet of the expander. The conventional process is also characterized in the undesirable formation of excessive amounts of fine rubber particles (fines) which are generated upon the cutting of the dried crumb exiting the die plate.

The art is noted to include the disclosure by T. Sakai et al in "Experimental Study of Dewatering and Devolatilizing Operations Using Intermeshed Twin Screw Extruders"—published in Intern. Polymer Processing VIII (1993), 3 p. 218. This article disclosed in general terms a dewatering operation entailing a dewatering (squeezing) process to remove water from aqueous polymer solution and crumbs. The operating steps thus disclosed include screw conveying of crumbs with a large amount of water, squeezing water mechanically and separating water through the cage bars of a twin screw extruder, and devolatilizing water as steam. Importantly, the L/D ratio characterizing the Sakai extruder is 32 to 56, and the screw is understood to feature a constant channel depth.

Also relevant is DE 44 02 394 which disclosed mechanical dewatering of water-moist rubber. The extruder thus described has at least two built-in accumulation areas and two associated dewatering outlets as well as at least one kneading zone that is followed by at least one venting zone and a discharge zone. There is nothing in the '394 document to describe the single screw extruder of the present invention and the parameters of the presently disclosed process.

DETAILED DESCRIPTION OF THE INVENTION

Figure 1:
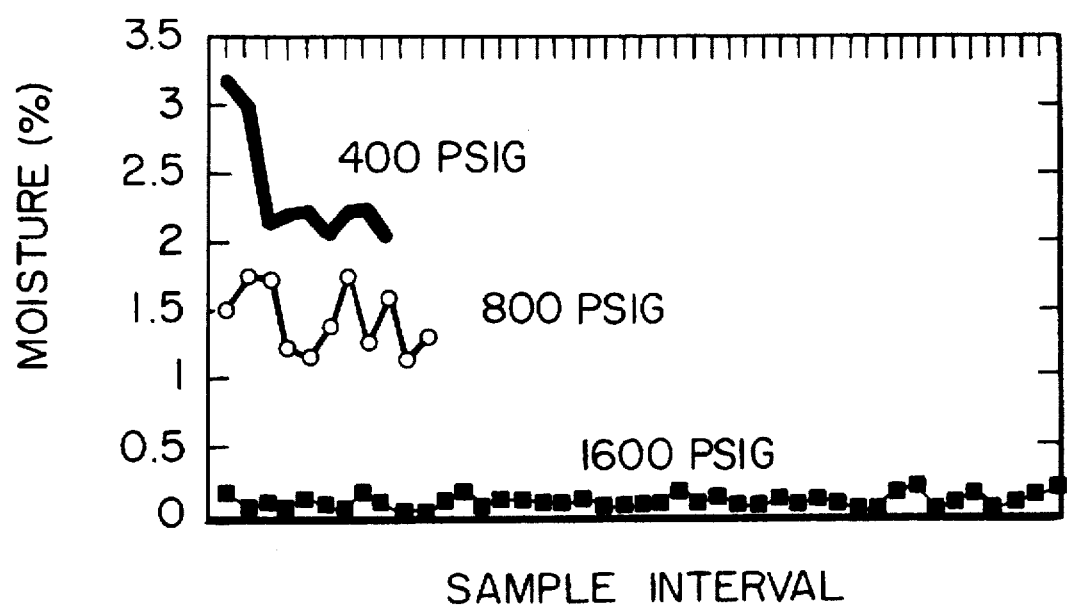
FIG. 1 shows the dependence of the water content in the EP(D)M rubber on the operating pressure across the die plate.

The inventive process makes use of a single screw extruder having a characteristic screw design. For successfully using the single screw extruder in dewatering of EP(D)M, it is necessary that the screw features a preferably gradually decreasing channel depth. Further critical to the successful operation of the process, is the L/D (length to diameter) ratio which characterizes the single screw. In accordance with the present invention, this ratio needs to be in the range of 9 to 15, preferably 12 to 14. Lastly, critical are the relative lengths of the expeller and expander sections which are integral parts of the useful extruder. In accordance with the present invention, the expander section needs to be about twice the length of the expeller section.

The extruder useful in carrying out the inventive process features a conventional feeding (inlet) section wherein the screw elements form a continuous helix having a relatively deep channel. This deep channel enables the introduction, at this point, of a large quantity of wet crumb in loose form and enables its conveyance from this feeding section to the expeller section.

The screw configuration in the expeller section is a discontinuous helix with a preferably gradually decreasing channel depth. The channel depth in the beginning portion (inlet end) of this expeller section is about 60% of the depth of the inlet section. With the preferably gradually decreasing depth, there is a concurrent reduction in the available volume which results in compression of the material and the consequential increase in the level of working pressure. The screw in this expeller-section functions so as to moderately compress the EP(D)M rubber to a degree that water is pressed through open cage bars (the term "cage bars" as used in the present context refers to "open slits" or, alternatively, to "slitted barrel" all of which are terms of art) which form an integral feature of the shell casing of the apparatus in this section. Care must be taken, however, that the operating pressure in this section is not too high so as to cause the rubber to be pressed through the open cage bars. Typically, the pressure build-up in this section is in the order of 60 to 100 psi.

The screw in the expander section is characteristically a discontinuous helix. The channel depth at the beginning of this expander section is about 20% of the channel depth at the inlet section. This reduction in channel depth results in further compression to be exerted on the rubber and the consequential increase in the working pressure. In the final section of the apparatus, the exit section of the expander, the screw is a continuous helix and the beginning channel depth (the section closest to the inlet section) is approximately 10% of the value at the inlet section. In this section, the material is pressed under maximum pressure through the die plate.

The material exits the extruder through the die plate which features a plurality of orifices enabling the discharge of the dried crumb. The orifices' dimensions are typically about 3/32" to 5/8" in diameter. The operating pressure of the extruder is partially controlled by the total number of holes in the die and their size.

Typically, the screw operates at about 80 to 120 rpm to bring about the conditions for successful dewatering of EP(D)M rubber in accordance with the inventive process.

In the practice of the inventive method, wet crumb, containing EP(D)M rubber and water, is fed continuously into the inventive apparatus described above. Typically, the water content in the wet crumb (water content—including "free" and chemical-physically bound water) of up to 60%, is relative to the total weight of rubber and water. The processed crumb in a substantially dried state is discharged through the die plate. The extruded material exiting the die is subjected to a pressure drop which causes the remaining moisture entrapped in the EP(D)M crossing the die, to flash as vapor.

The exiting extrudate, typically containing water in an amount of less than about 1%, preferably less than 0.5%, is cut by a rotating fly cutter which may be of either fixed or variable speed. The speed of the cutter determines the size of the resulting pellets and to an extent, the production of fines.

In carrying out the process according to the present invention, the moisture content which characterize a typical EPM material (having a Mooney viscosity at 100° C. in the range of 30 to 40) and the operating temperature and pressure are shown in Table 2.

TABLE 2

|  | Inlet moisture (%) | Outlet moisture (%) | material temperature, °F. @ outlet | Operating pressure |
|---|---|---|---|---|
| Dewatering Screen | 90 | 40 | 212 | atmospheric |
| Inventive Expeller/ expander | 40 | <0.5 | 240 | 1600 psi |

As may be appreciated, the operating pressure in the course of the inventive process is considerably greater than the pressure in the corresponding conventional process. Obtaining and maintaining a high operating pressure across the die of not less than 1200 psi, preferably not less than 1600 psi, is critical to the process. The pressure is primarily determined by the rate of material flow. The higher the rate at a given shaft speed, the higher the pressure. The operating pressure may be decreased with increasing the total area of holes in the die plate. It has been observed that the pressure increases as the Mooney viscosity of the EP(D)M increases, for the same open area and production rate. Further critical to proper running of the inventive process is the temperature control. Care must be exercised to limit the maximum temperature of the crumb to less than 400° F., preferably no higher than 250° F.

The characteristic screw design, the preferably gradually decreasing channel depth, enables the inventive process. This design permits conveying of the wet and drying crumb through the length of the extruder while compressing out water and at the same time avoiding generating heat through excessive shear.

The invention is further illustrated but is not intended to be limited by the following examples in which all parts and percentages are by weight unless otherwise specified.

EXAMPLES

The criticality of the temperature and pressure on the process of the invention has been demonstrated through a series of experiments. FIG. 1 illustrates the relationship between the operating pressure (psig) and the water content (moisture, %) of the extrudate. The temperature of the extrudate was about 230° to 250° F.

The increased operating pressure results in a substantial decrease in the water content of the exiting rubber. Most favorable reduced moisture for the demonstrated EP(D)M has been achieved at 1600 psig. It has been noted that the inventive process enables the production of EP(D)M rubber which is virtually free from discoloration and that the dry rubber exhibits a markedly reduced level of fines.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process of dewatering EP(D)M rubber comprising, sequentially the steps of
    (i) introducing wet EP(D)M rubber, into a single screw extruder which includes a die plate and an inlet section, said screw characterized in having a constant pitch and decreasing channel depth, said screw traversing a shell casing comprising (a) an expeller section and (b) an expander section positioned immediately downstream from said expeller section, said screw being further characterized by its discontinuous helix flights and in that the ratio between its length to its diameter is about 9 to 15, said expeller section being about one half the length of said expander section
    (ii) conveying said wet rubber through said extruder under conditions sufficient to expel water through said expeller section, to increase pressure across said die plate to a level not less than 1200 psi, to heat said crumb to a temperature no higher than 400° F., and to extrude dried crumb containing less than 1% water, and (iii) collecting dried crumb, said wet EP(D)M rubber containing up to 50% water, said percent being relative to the total weight of said rubber and water.

2. The process of claim 1 wherein said ratio is about 12 to 14.

3. The process of claim 1 wherein said deceasing channel depth is gradual.

4. The process of claim 1 wherein said channel depth at the inlet end of the expeller section is about 60% of the depth of the inlet section.

5. The process of claim 1 wherein said channel depth at the inlet end of the expander section is about 20% of the depth of the inlet section.

* * * * *